(12) United States Patent
Bronshteyn et al.

(10) Patent No.: US 8,449,223 B2
(45) Date of Patent: May 28, 2013

(54) CUTTING TOOL HAVING A BIDIRECTIONAL ADJUSTMENT MECHANISM

(75) Inventors: Alexander Bronshteyn, Nahariya (IL); Alexander Koifman, Kfar Vradim (IL); Amir Satran, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 448 days.

(21) Appl. No.: 12/793,006

(22) Filed: Jun. 3, 2010

(65) Prior Publication Data

US 2010/0316453 A1 Dec. 16, 2010

(30) Foreign Application Priority Data

Jun. 16, 2009 (IL) .......................................... 199376

(51) Int. Cl.
*B23C 5/24* (2006.01)

(52) U.S. Cl.
CPC ...................................... *B23C 5/24* (2013.01)
USPC .............................................. 407/36; 407/44

(58) Field of Classification Search
USPC ..................... 407/36, 37, 38, 44, 45, 49, 50
See application file for complete search history.

(56) References Cited

U.S. PATENT DOCUMENTS

| | | | | |
|---|---|---|---|---|
| 4,602,899 | A * | 7/1986 | Vig | 408/153 |
| 6,511,264 | B2 * | 1/2003 | Ripley | 407/36 |
| 7,014,393 | B2 * | 3/2006 | Matheis | 407/37 |
| 2008/0044240 | A1 * | 2/2008 | Satran et al. | 407/36 |

FOREIGN PATENT DOCUMENTS

| | | |
|---|---|---|
| DE | 22 63 634 | 7/1974 |
| DE | 23 09 430 | 9/1974 |
| DE | 39 36 243 | 5/1991 |
| EP | 0 388 783 | 9/1990 |
| JP | 2003 165004 | 6/2003 |
| WO | 2007/058513 | 5/2007 |
| WO | 2009/030378 | 3/2009 |

OTHER PUBLICATIONS

International Search Report in PCT/IL2010/000415, dated Aug. 30, 2010.

* cited by examiner

*Primary Examiner* — Daniel Howell
*Assistant Examiner* — Alan Snyder
(74) *Attorney, Agent, or Firm* — Womble Carlyle

(57) ABSTRACT

An adjustment mechanism allows for bidirectional adjustment of the position of a cutting insert retained in a cutting tool by a securing screw. The adjustment mechanism includes an adjustment screw, a slider, the cutting insert and the securing screw. The rotation of the adjustment screw in opposite senses results in the bidirectional axial adjustment of the position of the cutting insert, while the securing screw is fixed in and retains the cutting insert.

15 Claims, 8 Drawing Sheets

CUTTING TOOL HAVING A BIDIRECTIONAL ADJUSTMENT MECHANISM

FIELD OF THE INVENTION

The present invention relates to an adjustment mechanism for bidirectional adjustment of the position of a cutting insert retained in a cutting tool.

BACKGROUND OF THE INVENTION

As is well known in the art, cutting inserts for metal cutting operations and particularly for roughing and finishing in one operation, are retained in insert pockets by fastening means such as securing screws. The cutting inserts have to be positioned accurately in the cutting tool in which they are retained, particularly in the axial direction, for increasing the lifetime of the cutting inserts and for a smooth surface finish of a work piece. Adjusting the location of each cutting insert may be done by an adjustment screw.

Face milling cutters with adjustment devices are well known. The position of a cutting insert secured to the cutter can be adjusted axially by screw rotation of an adjustment screw, which can effect the movement of the cutting insert, the securing screw, or an additional device such as a wedge or a cartridge. Threading the additional screw to the opposite direction results in adjustment of the position of the cutting insert axially in the opposite direction. A securing screw has to be tightened to secure the cutting insert in place after the cutting insert has been adjusted. The process can be time consuming and less accurate, as the securing screw can further communicate with the axial adjustment of the cutting insert.

PCT Patent Application Publication No. WO2007/058513 discloses a cutting tool including a pocket portion to which a cutting insert is mounted, and a screw for finely adjusting the position of the cutting insert fixed to the pocket portion of the tool. The screw has a head portion, a threaded portion, and a portion for connecting the head portion to the threaded portion. The pocket portion has a bottom surface with a screw hole formed thereon into which the threaded portion is fastened. It also has a side wall including a surface for closely contacting the head portion of the screw. The head portion of the screw closely contacts and resiliently pressurizes the close contact surface of the pocket portion when the threaded portion is fastened into the screw hole. Furthermore, the screw is configured such that the head portion is pressurized by the close contact surface of the pocket portion. This displaces the central axis of the head portion in a direction opposite to the close contact surface relative to the central axis of the threaded portion when the screw is fastened into the screw hole of the pocket portion, adjusting the cutting insert. After the adjustment is done, the cutting insert is mounted by other means not shown for fixing the cutting insert to the pocket portion.

U.S. Pat. No. 7,014,393 discloses a prestressable and fastenable cutter insert by means of a tension screw with its bottom surface against a seat surface such that it is supported with lateral wall sections in a positionally fixed manner on a cutter support. The clamping and adjustment apparatus has an adjustment wedge which can be actuated by means of a pressure screw in a direction that extends essentially parallel to the seat surface. After the cutting insert has been adjusted to its dimension, the cutting insert is fastened using the prestressing and fastening apparatus in its final position.

SUMMARY OF THE INVENTION

The present invention provides a cutting tool having an axis of rotation and including a cutter body with a plurality of cutting insert retaining pockets circumferentially spaced about the outer periphery of the cutter body and cutting inserts releasably retained in the cutting insert pockets by a securing screw threadingly received in a securing through-hole in the cutter body. Each cutting insert has opposing top and bottom surfaces and a peripheral side surface extending therebetween. The peripheral side surface of the cutting insert has a plurality of abutment surfaces, wherein only two abutment surfaces are operative abutment surfaces.

In accordance with a preferred embodiment, each cutting insert is adjusted axially by an adjustment mechanism having an adjustment through-hole in the cutter body and an adjustment screw threadingly received in the adjustment through-hole, the adjustment screw having an axis of screw rotation and containing a screw head.

The adjustment mechanism further includes a slider retained in a slider pocket, the slider being in communication with the cutting insert at a front surface of the slider and with the screw head of the adjustment screw at a rear surface of the slider via a region of communication between the slider pocket and the adjustment through-hole. The slider includes opposing top and bottom surfaces and a peripheral side surface extending therebetween. The peripheral side surface of the slider contains a front surface having the form of a "V" shaped recess, side surfaces, and a concave rear surface. The peripheral side surface of the slider includes at least two distinct support sections provided on the slider front surface. The support sections of the slider front surface abut the operative abutment surfaces of the cutting insert peripheral side surface.

The bottom surface of the slider includes at least two abutment sections. The slider pocket includes top and bottom surfaces. The bottom surface of the slider pocket has two abutment surfaces. The abutment sections of the slider bottom surface abut the abutment surfaces of the slider pocket bottom surface.

Screw rotation of the adjustment screw in one sense about the axis of screw rotation results in the screw head of the adjustment screw urging the slider and the cutting insert in a direction away from the adjustment screw and transverse to the axis of screw rotation, resulting in adjustment of the position of the cutting insert in a first direction.

Screw rotation of the adjustment screw in an opposite sense about the axis of screw rotation results in the securing screw urging the slider and the cutting insert in a direction away from the securing screw and transverse to the axis of screw rotation, resulting in adjustment of the position of the cutting insert in a direction opposite to the first direction.

In accordance with an embodiment, the adjustment screw is inclined at a non-zero angle $\alpha$ with respect to the axis of rotation of the cutting tool in a plane parallel to the top or bottom surfaces of the slider.

In accordance with some embodiments, the securing screw is inclined at an angle $\beta$ with respect to a line perpendicular to the base of the insert pocket in a plane parallel to the side surfaces of the slider.

In accordance with the present invention, the rotation of the adjustment screw in opposite senses results in the bidirectional axial adjustment of the position of the cutting insert, while the securing screw is fixed in and retains the cutting insert. This improved adjustment mechanism retains the cutting insert precisely and accurately, without the requirement to fasten again the cutting insert after the adjustment by the rotation of the adjustment screw.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
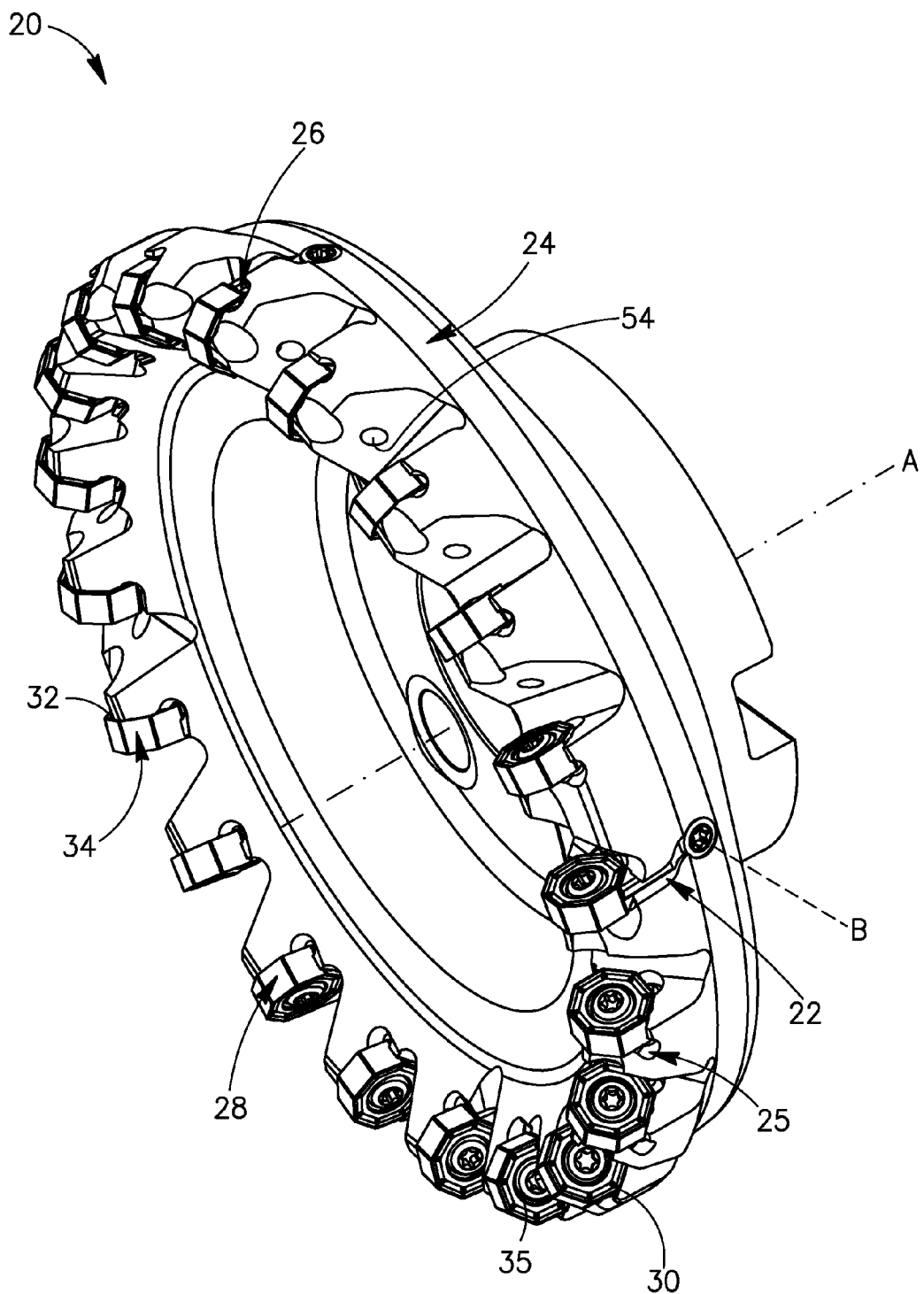
FIG. 1 is a perspective view of a cutting tool with cutting inserts and adjustment mechanisms according to the embodiment of the present invention.
Figure 2:
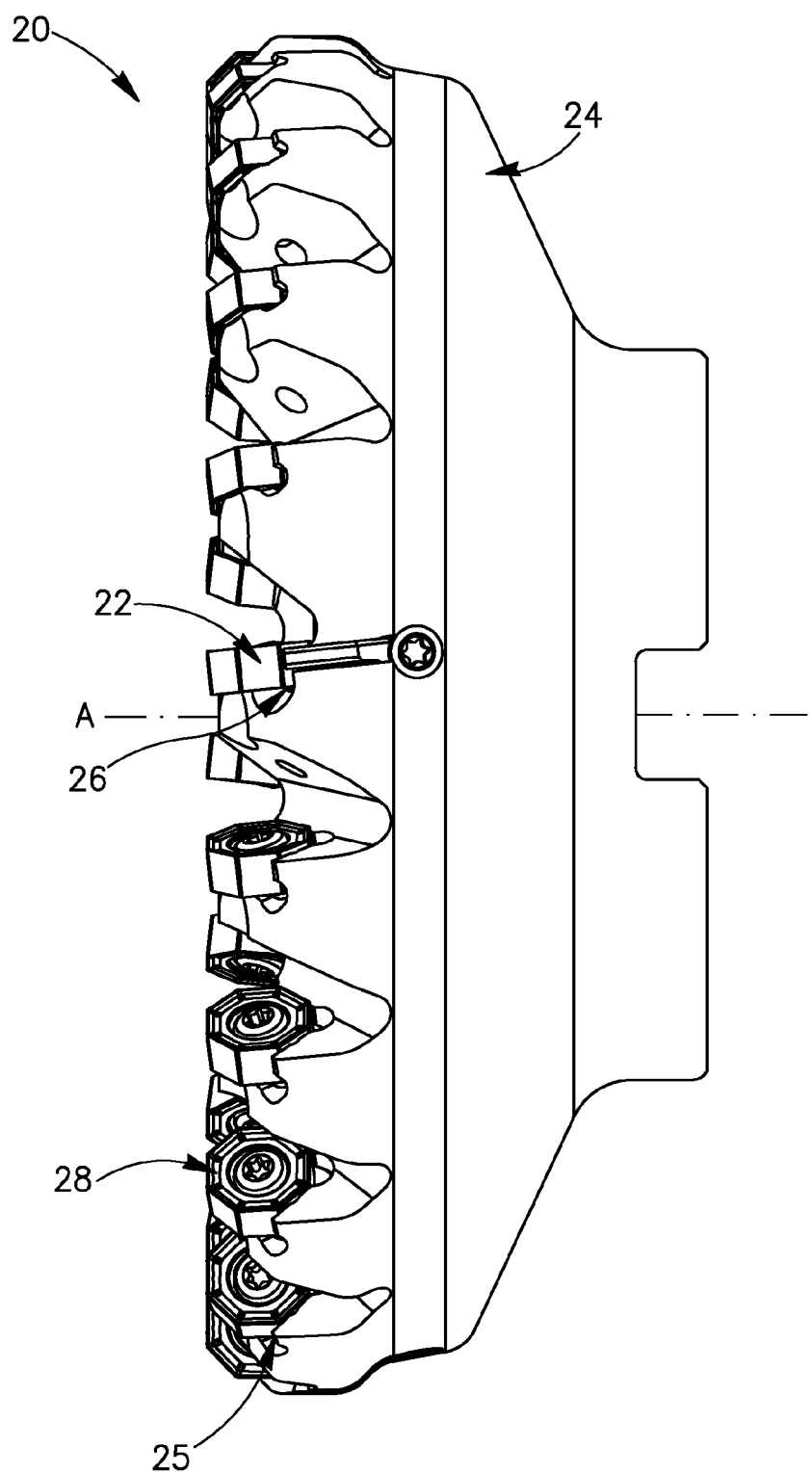
FIG. 2 is a side view of the cutting tool with cutting inserts and adjustment mechanisms seen in FIG. 1.

Attention is drawn to FIGS. 1 and 2, showing a cutting tool 20 with an axis of rotation A and having adjustment mechanisms 22 in accordance with embodiments of the invention. The cutting tool 20, for example a milling cutter, has a cutter body 24 with a plurality of cutting insert retaining pockets 25, 26 circumferentially spaced about the outer periphery of the cutter body 24 and cutting inserts 28 releasably retained in the cutting insert pockets 25, 26. Some of the cutting insert pockets 26 are adjustable while other cutting insert pockets 25 are fixed. Only the adjustable cutting insert pockets 26 will be described herein and they will be referred to henceforth simply as cutting insert pockets 26. Each cutting insert pocket 26 is provided with an identical adjustment mechanism 22 for axial adjustment of the position of a cutting insert 28. Each cutting insert 28 has top and bottom surfaces 30, 32, a peripheral side surface 34 extending therebetween, and a cutting insert through-hole 35 extending perpendicular to the top and bottom surfaces 30, 32.

Figure 3:
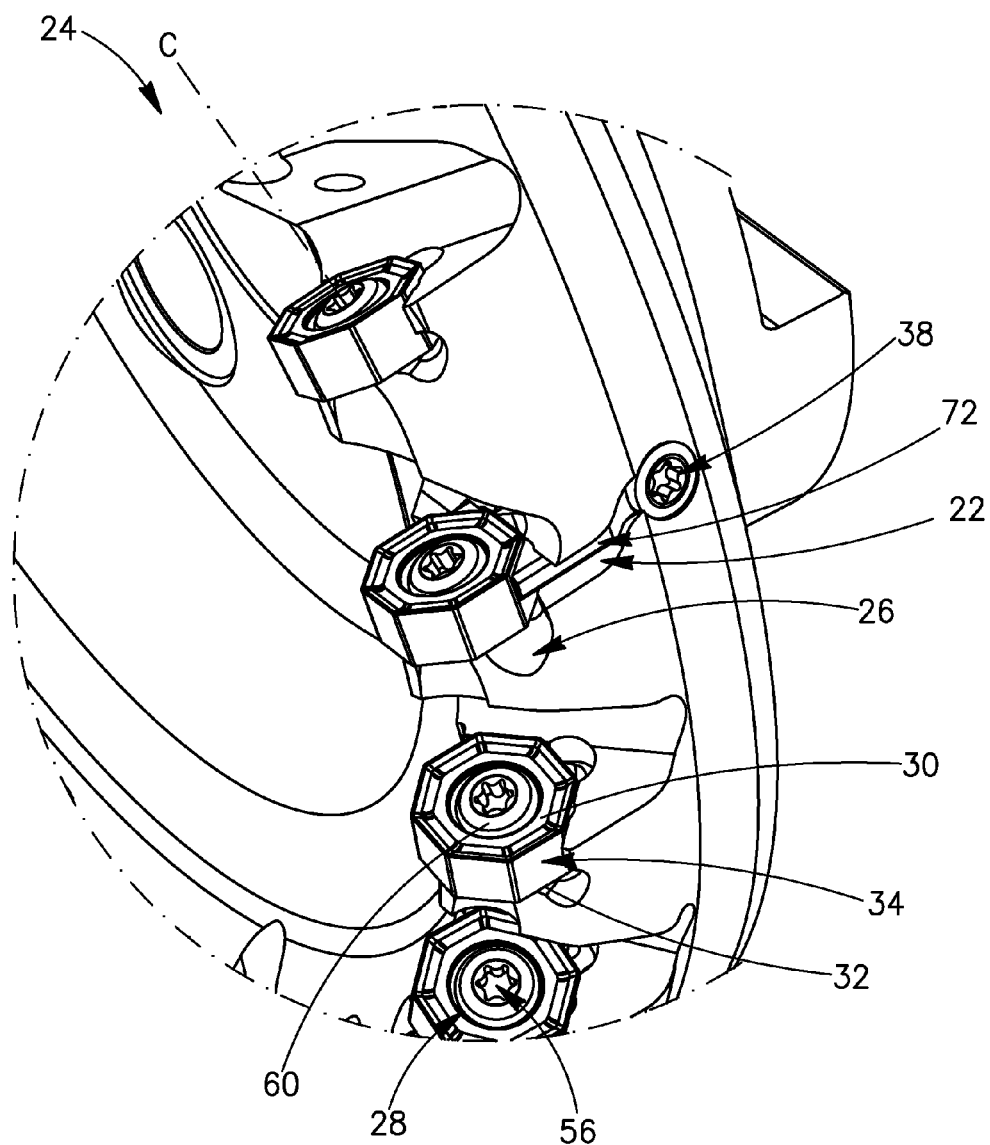
FIG. 3 is an enlarged view of a portion of FIG. 1 including the adjustment mechanism.
Figure 4:
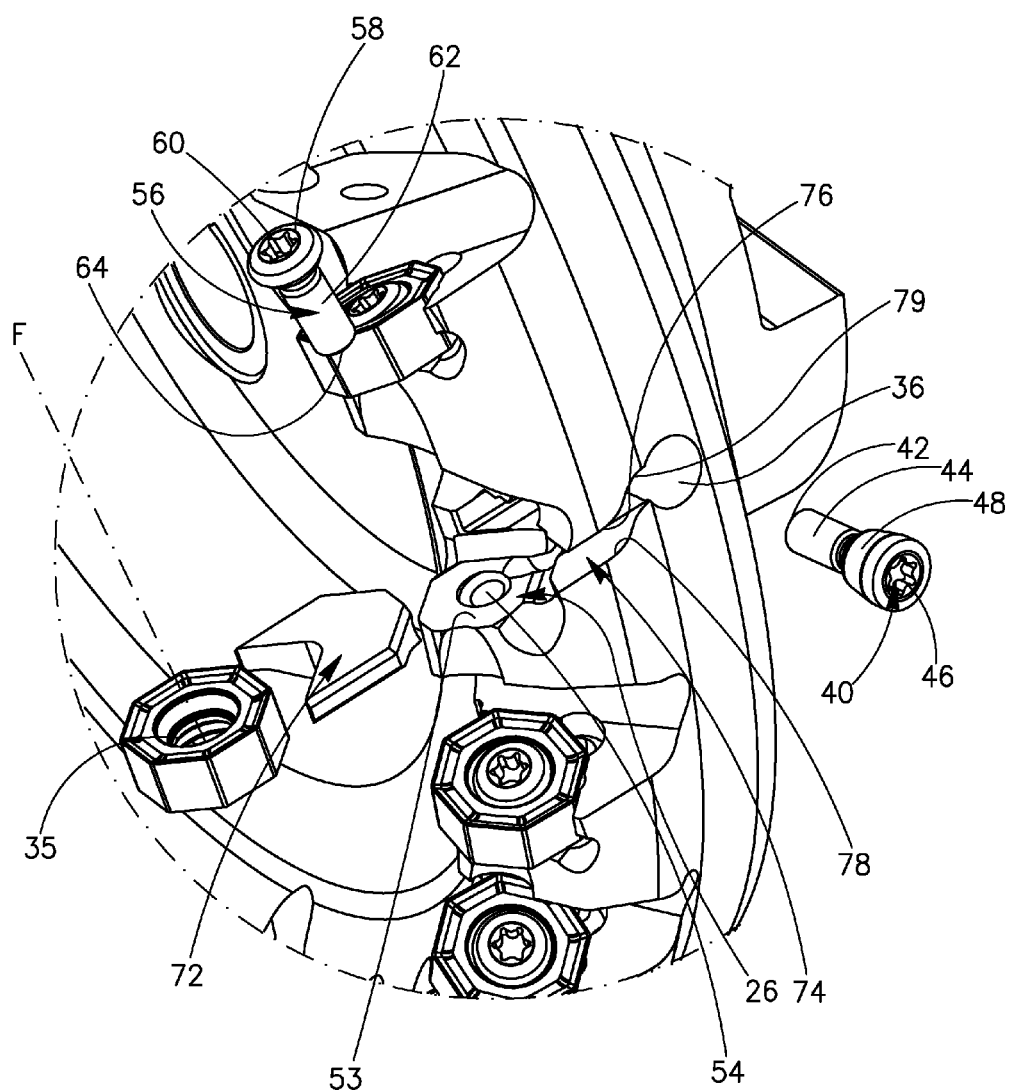
FIG. 4 is an exploded view of the adjustment mechanism seen in FIG. 3.

Attention is now additionally drawn to FIGS. 3 and 4. The adjustment mechanism 22 includes an adjustment through-hole 36 in the cutter body 24 and an adjustment screw 38 having an axis of screw rotation B (shown, e.g., in FIG. 5) located in the adjustment through-hole 36. The adjustment through-hole 36 may be generally radially directed with respect to the axis of rotation A. The adjustment screw 38 includes a screw head 40 and, at a forward end thereof 42 a threaded portion 44 which threadingly engages the adjustment through-hole 36. The screw head 40 contains a rear end 46 and a circumferential abutment surface 48.

The cutting insert pocket 26 has a base 53 having a threaded securing through-hole 54. The cutting insert 28 is retained in the cutting insert pocket 26 and secured to the base 53 by a resilient securing screw 56 which is threadingly received in the securing through-hole 54. The securing through-hole 54 has a securing through-hole axis C. The securing through-hole 54 may be generally tangentially directed with respect to the axis of rotation A. The securing screw 56 includes a screw head 58 at a rear end 60 and a threaded portion 62 at a forward end thereof 64.

As can be seen, for example, in FIG. 3, the adjustment mechanism 22 includes a slider 72 retained in a slider pocket 74. The slider pocket 74 includes top and bottom surfaces 76, 78 and opens out to the adjustment through-hole 36 at a region of communication 79 between the slider pocket 74 and the adjustment through-hole 36. The slider 72 includes opposing top and bottom surfaces 80, 82 and a peripheral side surface 84 extending therebetween (see, e.g., FIGS. 6-9). The peripheral side surface 84 of the slider 72 contains a front surface 86, side surfaces 88, and a rear surface 90. In accordance with some preferred embodiments, the front surface 86 of the slider peripheral side surface 84 has the form of a "V" shaped recess, to accommodate various shapes of cutting inserts. The rear surface 90 of the slider peripheral side surface 84 is concave to accommodate a portion of the screw head 40 of the adjustment screw 38 via the region of communication 79. The slider front surface 86 includes at least two distinct support sections 92 and 94, located on opposite sides of the "V" shaped recess. The bottom surface 82 of the slider 72 includes two abutment sections 98, 100, located on opposite sides of the bottom surface 82 with relation to a median section 96.

Figure 10:
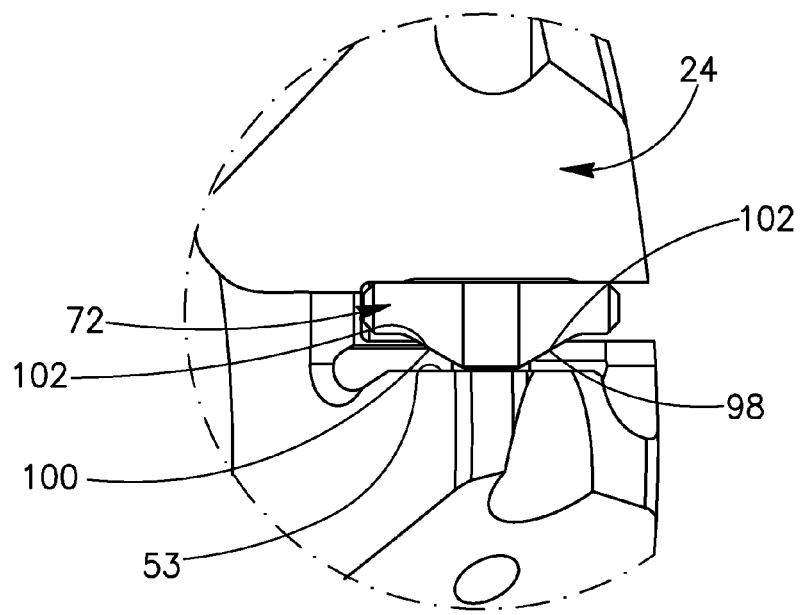
FIG. 10 is a front view of the adjustment mechanism seen in FIG. 9, shown from the direction of the arrow S.

As best seen in FIG. 10, the bottom surface 78 of the slider pocket 74 has two abutment surfaces 102. The abutment sections 98, 100 of the slider bottom surface 82 abut the abutment surfaces 102 of the slider pocket bottom surface 78.

Figure 5:
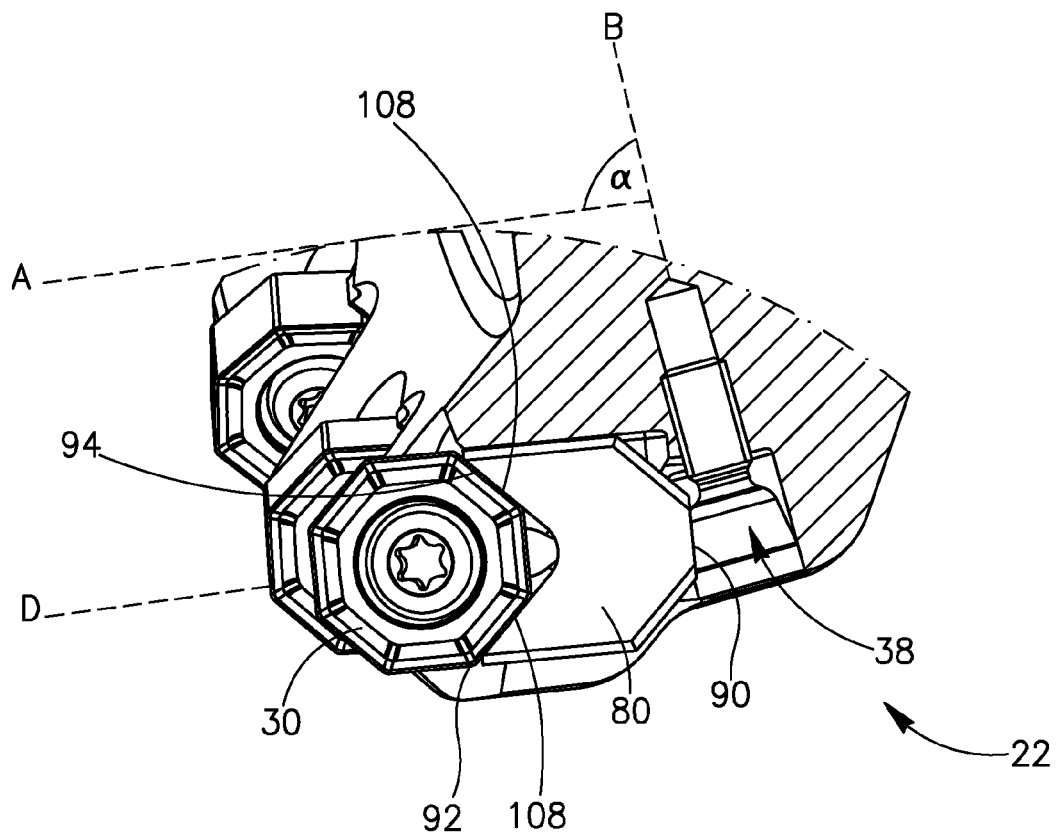
FIG. 5 is a partial section of FIG. 3 showing the adjustment mechanism in a top view.
Figure 6:
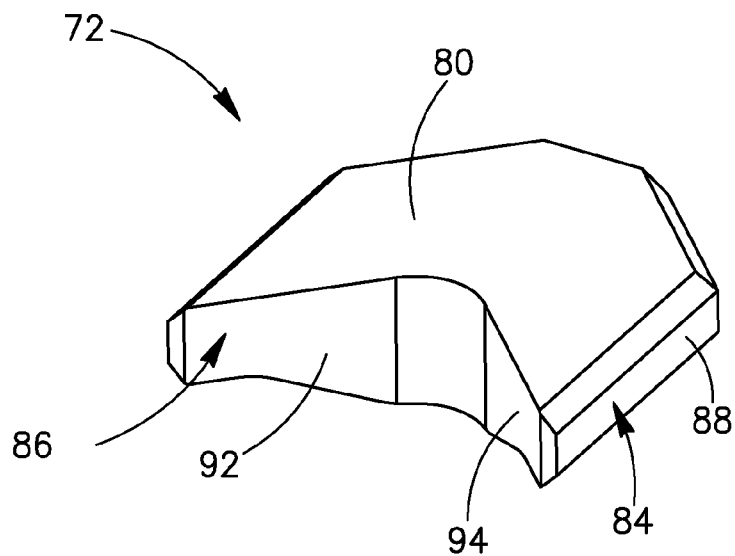
FIG. 6 is a perspective front view of a slider seen in FIG. 5.
Figure 7:
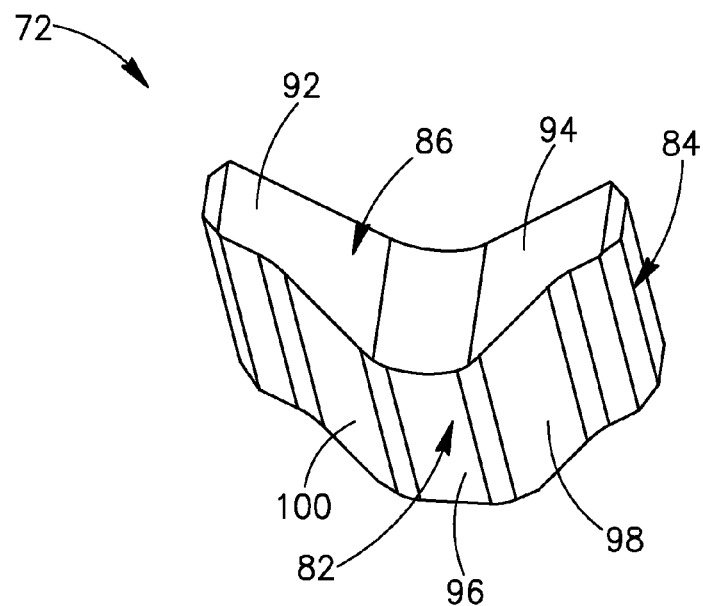
FIG. 7 is a perspective bottom view of the slider seen in FIG. 6.
Figure 8:
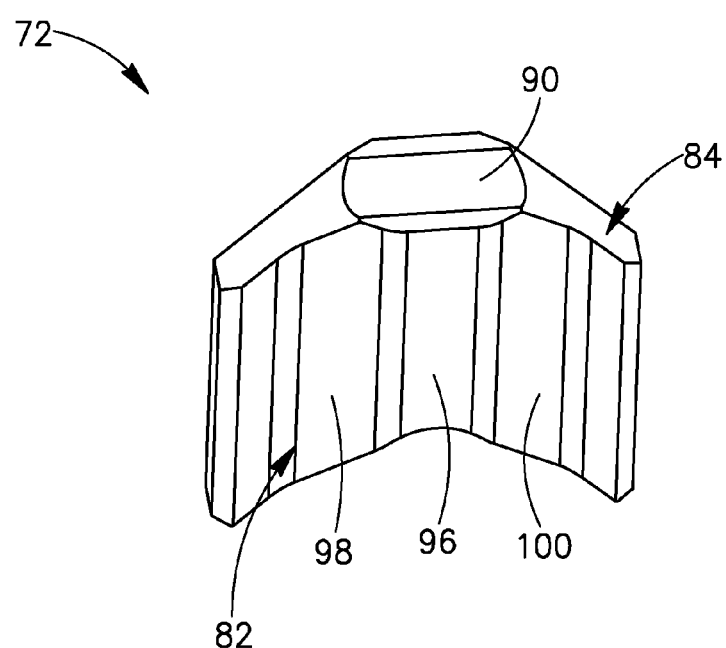
FIG. 8 is a rear view of the slider seen in FIG. 7.
Figure 9:
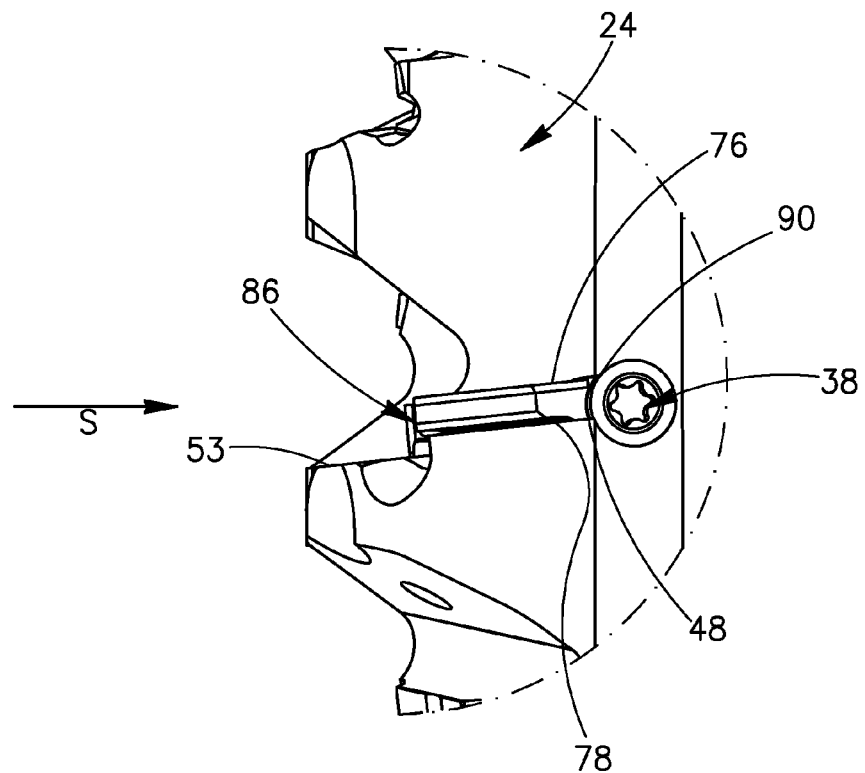
FIG. 9 is an enlarged view of a portion of FIG. 2 showing the adjustment mechanism in a side view with the cutting inserts and the securing screws removed.

In accordance with some preferred embodiments, and as can be seen in FIG. 5, the peripheral side surface 34 of the cutting insert 28 has eight abutment surfaces 108, wherein only two abutment surfaces of the eight abutment surfaces 108 are operative. While in the embodiment shown an octagonal cutting insert is employed, it is understood that some other shaped cutting insert may be used instead, wherein the support sections 92, 94 of the slider 72 are designed for supporting various shapes of cutting inserts. The support sections 92, 94 of the slider front surface 86 abut the operative abutment surfaces 108 of the cutting insert peripheral side surface 34, and the slider rear surface 90 abuts the circumferential abutment surface 48 of the adjustment screw head 40 via the region of communication 79 so that the adjustment screw 38 and the slider 72 are in communication.

The adjustment screw 38 is inclined at a non-zero angle α with respect to the axis of rotation A of the cutting tool 20 in a plane parallel to the top or bottom surfaces 80, 82 of the slider 72. Since the adjustment screw 38 and the slider 72 are in communication, the adjustment screw 38 may urge the slider 72 towards the cutting insert 28 when the adjustment screw 38 is screwed into the adjustment through-hole 36.

Figure 11:
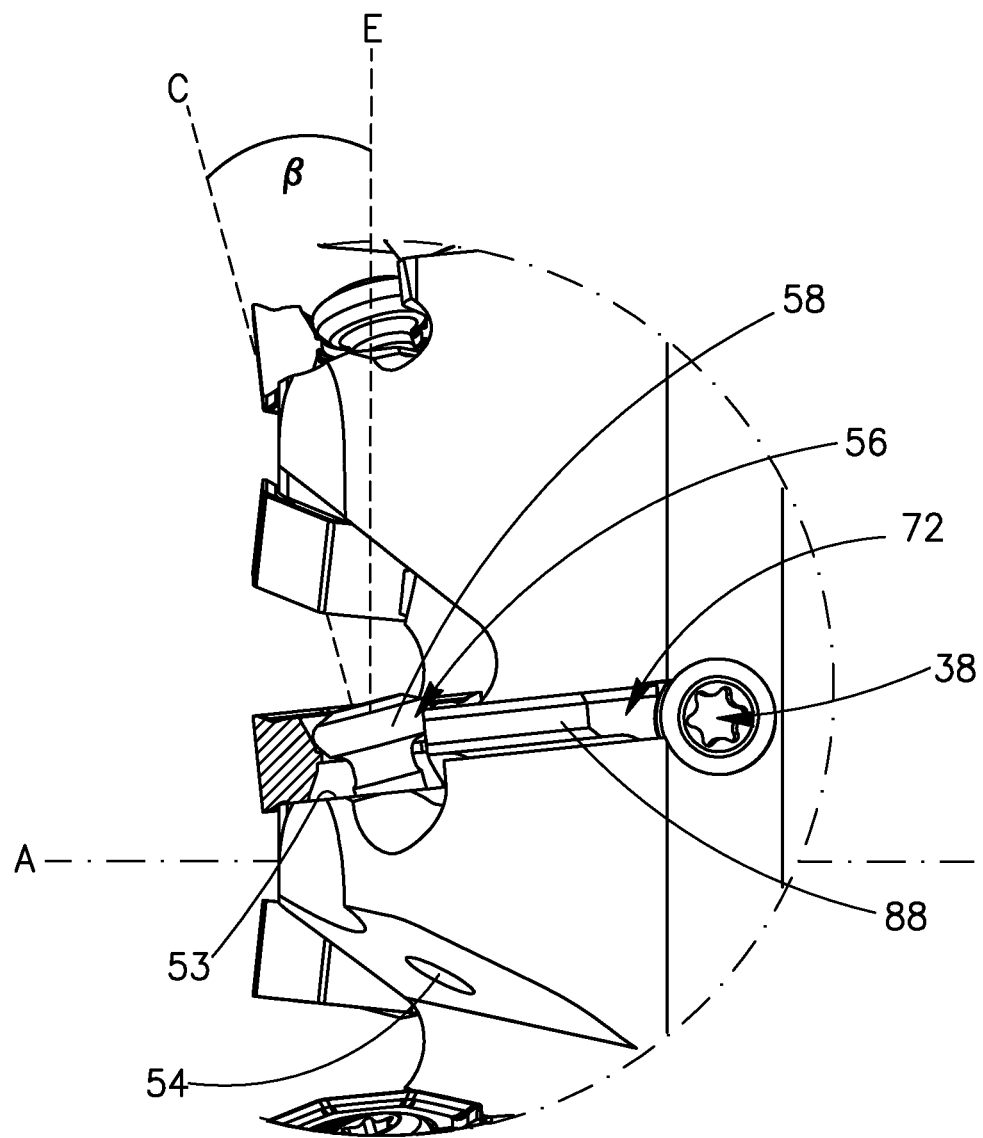
FIG. 11 is an enlarged view of a portion of FIG. 2 showing the adjustment mechanism in a side view with the cutting insert associated with the adjustment mechanism partially cut away.

Reference is made now to FIG. 11. The through-hole 54 and accordingly the securing screw 56 are inclined at an angle β with respect to a line E perpendicular to the base 53 in a plane parallel to the side surfaces 88 of the slider 72. The line E passes through the centre of a circle formed on the base 53 by the through-hole 54. The inclination of the securing screw 56 applies a force against the cutting insert 28 in a direction towards the slider 72.

As mentioned above, the slider 72 is retained in the slider pocket 78, wherein the slider front surface 86 protrudes from the slider pocket 74. The cutting insert 28 is placed in the insert pocket 26, and a centerline F of the cutting insert through-hole 35 parallel to line E is offset from the line E, in a direction away from the slider 72, wherein the cutting insert through-hole 35 is dimensioned to accommodate the securing screw head 58. The securing screw 56 is placed in the securing through-hole 54 and may be inclined at the same inclination angle as the securing through-hole 54 with respect to the line E perpendicular to the base 53. When the securing screw 56 is tightened, it urges the cutting insert 28 toward the slider 72.

Adjustment of the location of the slider 72 and consequently of the location of the cutting insert 28 is achieved by screw rotation of the adjustment screw 38 about the axis of screw rotation B. As the adjustment screw 38 is screw rotated in one direction, or in one sense, about the axis of screw rotation B, it moves along the axis of screw rotation B, into the adjustment through-hole 36. By virtue of the rotation, the adjustment screw 38 urges the slider 72 in a direction transverse to the axis of screw rotation B away from the adjustment screw 38 and towards the cutting insert 28. The force applied by the adjustment screw 38 has to be sufficient to overcome the force acting by the securing screw 56 mentioned above. The slider 72 is displaced in a direction away from the adjustment screw 38, sliding towards the cutting insert 28, along a line D which is perpendicular to the line E perpendicular to the base 53, and the slider 72 further protrudes, but still partially, from the slider pocket 74. As a consequence, the cutting insert 28 is urged forward by the slider 72 along the line D (See FIG. 5), wherein the centerline F of the cutting insert through-hole 35 is further offset from the line E as the securing screw 56 bends under the force applied to it by the slider 72. This builds up a resilient force in the securing screw 56 which tends to return the securing screw 56 to its original state, the resilient force acting in the direction towards the adjustment screw. If the axis of screw rotation B is radially directed with respect to the axis of rotation A of the cutting tool 20 then the cutting insert 28 moves approximately in the axial direction of the cutting tool 20. Any movement of the cutting insert 28 along the line D in a direction away from the axis of screw rotation B affects the motion of the securing screw 56, which is urged in the same direction.

As the adjustment screw 38 is screw rotated in the opposite direction, or opposite sense, it moves along the axis of screw rotation B, out from the adjustment through-hole 36. The applied force of the adjustment screw 38 on the slider 72, and accordingly on the cutting insert 28 and the securing screw 56, is released, and the securing screw 56 may return, by means of the resilient force built up in the securing screw 56, to its original position before the force was applied by the adjustment screw 38. Thus, rotation of the adjustment screw 38 in the opposite sense results in release of the resilient force built up in the securing screw 56. Consequently, the cutting insert 28 and slider 72 are displaced backward along the line D wherein the centerline F of the cutting insert through-hole 35 returns to the initial offset from the line E. The cutting insert 28 urges the slider 72 towards the adjustment screw 38 in a direction transverse to the axis of screw rotation B, with the slider front surface 86 protruding from the slider pocket 74, located in the initial position before the adjustment is made.

The adjustment mechanism 22 is bidirectional. The adjustment screw 38 can either be screw rotated inwardly, progressing into the cutter body 24 or the adjustment screw 38 can be screw rotated outwardly, away from the cutter body 24. In other words, screw rotation of the adjustment screw 38 in opposite senses about the axis of screw rotation B results in the adjustment of the position of the cutting insert 28 in opposite directions (i.e., bidirectional) in the direction of the axis of rotation A of the cutting tool 20, or in general, in a direction transverse to the axis of screw rotation B. The adjustment of the position of the cutting insert 28 is done by the adjustment screw 38 only, without rotation or removal of the securing screw 56, which increases to a great extent the accuracy of the position of the cutting insert 28 retained in the cutting tool 20, as required. Furthermore, the adjustment screw 38 does not directly contact the cutting insert 28.

The present invention has been illustrated for axial adjustment of the location of cutting inserts 28. However, there is no inherent limitation on the direction of adjustment. Hence, the adjustment screw 38 could be directed, for example, so that the axis of screw rotation B of the adjustment screw 38 is in the axial direction, thereby giving rise to a bidirectional adjustment mechanism 22 to adjust the radial location of the cutting insert 28. Likewise, the adjustment screw 38 could be directed, for example, so that the axis of screw rotation B of the adjustment screw 38 is in any given intermediate direction between the axial and radial directions, thereby giving rise to a bidirectional adjustment mechanism 22 to adjust the location of the cutting insert 28 in the given intermediate direction.

Although the present disclosure has been described to a certain degree of particularity, it should be understood that alterations and modifications to the present disclosure may possibly be made without departing from the scope of the disclosure as hereinafter claimed.

What is claimed is:

1. A cutting tool (20) having an axis of rotation (A) and comprising:
    a cutter body (24) having a plurality of cutting insert retaining pockets (26) circumferentially spaced about an outer periphery thereof, each cutting insert retaining pocket (26) having at least one cutting insert (28) releasably retained therein by a securing screw (56) threadingly received in a securing through-hole (54) in the cutter body (24);
    an adjustment through-hole (36) in the cutter body (24);
    an adjustment screw (38) threadingly received in the adjustment through-hole (36), the adjustment screw (38) having an axis of screw rotation (B) and comprising a screw head (40);
    a slider (72) retained in a slider pocket (74), the slider (72) being in communication with the cutting insert (28) at a front surface (86) of the slider (72) and with the screw head (40) of the adjustment screw (38) at a rear surface (90) of the slider (72); wherein:
    screw rotation of the adjustment screw (38) in one sense about the axis of screw rotation (B) results in the screw head (40) of the adjustment screw (38) urging the slider (72) and the cutting insert (28) in a direction away from the adjustment screw (38) and transverse to the axis of screw rotation (B), resulting in adjustment of the position of the cutting insert (28) in a first direction; and
    screw rotation of the adjustment screw (38) in an opposite sense about the axis of screw rotation (B) results in the securing screw (56) urging the slider (72) and the cutting insert (28) in a direction towards the adjustment screw (38) and transverse to the axis of screw rotation (B), resulting in adjustment of the position of the cutting insert (28) in a direction opposite to the first direction.

2. The cutting tool (20) according to claim 1, wherein the cutting insert (28) has a peripheral side surface (34) having a plurality of abutment surfaces (108), wherein only two abutment surfaces (108) are operative abutment surfaces (108).

3. The cutting tool (20) according to claim 2, wherein a peripheral side surface (84) of the slider (72) comprises at least two distinct support sections (92, 94) provided on the slider front surface (86), which support sections (92, 94) abut the operative abutment surfaces (108).

4. The cutting tool (20) according to claim 1, wherein the slider (72) comprises opposing top and bottom surfaces (80, 82) and a peripheral side surface (84) extending therebetween; and
wherein the peripheral side surface (84) of the slider (72) comprises a front surface (86) having the form of a "V" shaped recess, side surfaces (88), and a concave rear surface (90).

5. The cutting tool (20) according to claim 4, wherein the peripheral side surface (84) of the slider (72) comprises at least two distinct support sections (92, 94) provided on the slider front surface (86).

6. The cutting tool (20) according to claim 4, wherein the bottom surface (82) of the slider (72) comprises at least two abutment sections (98, 100).

7. The cutting tool (20) according to claim 6, wherein:
the slider pocket (74) comprises top and bottom surfaces (76, 78); and
the bottom surface (78) of the slider pocket (74) has two abutment surfaces (102).

8. The cutting tool (20) according to claim 7, wherein the abutment sections (98, 100) of the slider bottom surface (82) abut the abutment surfaces (102) of the slider pocket bottom surface (78).

9. The cutting tool (20) according to claim 1, wherein:
the adjustment screw (38) is inclined at a non-zero angle ($\alpha$) with respect to the axis of rotation (A) in a plane parallel to the top or bottom surfaces (80, 82) of the slider (72).

10. The cutting tool (20) according to claim 1, wherein the securing screw (56) is inclined at an angle ($\beta$) with respect to a line (E) perpendicular to the base (53) of the cutting insert retaining pocket (26) in a plane parallel to the side surfaces (88) of the slider (72).

11. The cutting tool (20) according to claim 1, wherein:
the slider (72) is in communication with the adjustment screw (38) via a region of communication (79) between the slider pocket (74) and the adjustment through-hole (36).

12. A cutting tool (20) having an axis of rotation (A) and comprising:
a cutter body (24) having a plurality of cutting insert retaining pockets (26) circumferentially spaced about an outer periphery thereof, each cutting insert retaining pocket (26) having a cutting insert (28) releasably retained therein by a securing screw (56) passing through the cutting insert (28) and threadingly engaged to the cutting insert retaining pocket (26);
an adjustment through-hole (36) formed in the cutting tool;
an adjustment screw (38) received in the adjustment through-hole (36), the adjustment screw (38) having an axis of screw rotation (B); and
a slider (72) having a front surface (86) in communication with the cutting insert (28) and a rear surface (90) in communication with the adjustment screw (38); wherein:
screw rotation of the adjustment screw (38) in one sense about the axis of screw rotation (B) results in:
displacement of the slider (72) and the cutting insert (28) in a direction away from the adjustment screw (38) and transverse to the axis of screw rotation (B); and
a resilient force being built up in the securing screw (56), the resilient force acting in the direction towards the adjustment screw (38); and
screw rotation of the adjustment screw (38) in an opposite sense about the axis of screw rotation (B) results in:
release of the resilient force built up in the securing screw (56); and
displacement of the cutting insert (28) and slider (72) in a direction towards the adjustment screw (38).

13. A cutting tool (20) comprising:
a cutter body (24) having at least one cutting insert (28) releasably retained in a cutting insert pocket (26) by a securing screw (56) threadingly received in a securing through-hole (54) in the cutter body (24);
an adjustment through-hole (36) in the cutter body (24);
an adjustment screw (38) threadingly received in the adjustment through-hole (36), the adjustment screw (38) having an axis of screw rotation (B) and comprising a screw head (40);
a slider (72) retained in a slider pocket (74), the slider (72) being in communication with the cutting insert (28) at a front surface (86) of the slider (72) and with the screw head (40) of the adjustment screw (38) at a rear surface (90) of the slider (72); wherein:
screw rotation of the adjustment screw (38) in one sense about the axis of screw rotation (B) results in the screw head (40) of the adjustment screw (38) urging the slider (72) and the cutting insert (28) in a direction away from the adjustment screw (38) and transverse to the axis of screw rotation (B), resulting in adjustment of the position of the cutting insert (28) in a first direction; and
screw rotation of the adjustment screw (38) in an opposite sense about the axis of screw rotation (B) results in the securing screw (56) urging the slider (72) and the cutting insert (28) in a direction towards the adjustment screw (38) and transverse to the axis of screw rotation (B), resulting in adjustment of the position of the cutting insert (28) in a direction opposite to the first direction;
wherein the slider (72) comprises opposing top and bottom surfaces (80, 82) and a peripheral side surface (84) extending therebetween; and
wherein the peripheral side surface (84) of the slider (72) comprises a front surface (86) having the form of a "V" shaped recess, side surfaces (88), and a concave rear surface (90).

14. A cutting tool (20) comprising:
a cutter body (24) having at least one cutting insert (28) releasably retained in a cutting insert pocket (26) by a securing screw (56) threadingly received in a securing through-hole (54) in the cutter body (24);
an adjustment through-hole (36) in the cutter body (24);
an adjustment screw (38) threadingly received in the adjustment through-hole (36), the adjustment screw (38) having an axis of screw rotation (B) and comprising a screw head (40);
a slider (72) retained in a slider pocket (74), the slider (72) being in communication with the cutting insert (28) at a front surface (86) of the slider (72) and with the screw head (40) of the adjustment screw (38) at a rear surface (90) of the slider (72); wherein:
screw rotation of the adjustment screw (38) in one sense about the axis of screw rotation (B) results in the screw head (40) of the adjustment screw (38) urging the slider (72) and the cutting insert (28) in a direction away from the adjustment screw (38) and transverse to the axis of screw rotation (B), resulting in adjustment of the position of the cutting insert (28) in a first direction; and screw rotation of the adjustment screw (38) in an opposite sense about the axis of screw rotation (B) results in the securing screw (56) urging the slider (72) and the cutting insert (28) in a direction towards the adjustment screw (38) and transverse to the axis of screw rotation (B), resulting in adjustment of the position of the cutting insert (28) in a direction opposite to the first direction; wherein:

the cutting tool has an axis of rotation (A); and the adjustment screw (38) is inclined at a non-zero angle (cc) with respect to the axis of rotation (A) in a plane parallel to the top or bottom surfaces (80, 82) of the slider (72).

15. A cutting tool (20) comprising:

a cutter body (24) having at least one cutting insert (28) releasably retained in a cutting insert pocket (26) by a securing screw (56) threadingly received in a securing through-hole (54) in the cutter body (24);

an adjustment through-hole (36) in the cutter body (24);

an adjustment screw (38) threadingly received in the adjustment through-hole (36), the adjustment screw (38) having an axis of screw rotation (B) and comprising a screw head (40);

a slider (72) retained in a slider pocket (74), the slider (72) being in communication with the cutting insert (28) at a front surface (86) of the slider (72) and with the screw head (40) of the adjustment screw (38) at a rear surface (90) of the slider (72); wherein:

screw rotation of the adjustment screw (38) in one sense about the axis of screw rotation (B) results in the screw head (40) of the adjustment screw (38) urging the slider (72) and the cutting insert (28) in a direction away from the adjustment screw (38) and transverse to the axis of screw rotation (B), resulting in adjustment of the position of the cutting insert (28) in a first direction; and screw rotation of the adjustment screw (38) in an opposite sense about the axis of screw rotation (B) results in the securing screw (56) urging the slider (72) and the cutting insert (28) in a direction towards the adjustment screw (38) and transverse to the axis of screw rotation (B), resulting in adjustment of the position of the cutting insert (28) in a direction opposite to the first direction; wherein:

the securing screw (56) is inclined at an angle ($\beta$) with respect to a line (E) perpendicular to the base (53) of the cutting insert retaining pocket (26) in a plane parallel to the side surfaces (88) of the slider (72).

\* \* \* \* \*